June 20, 1944.   M. MENNESSON   2,351,992
AUXILIARY DEVICE ADAPTED TO DRIVE LIGHT VEHICLES
Filed Oct. 22, 1942
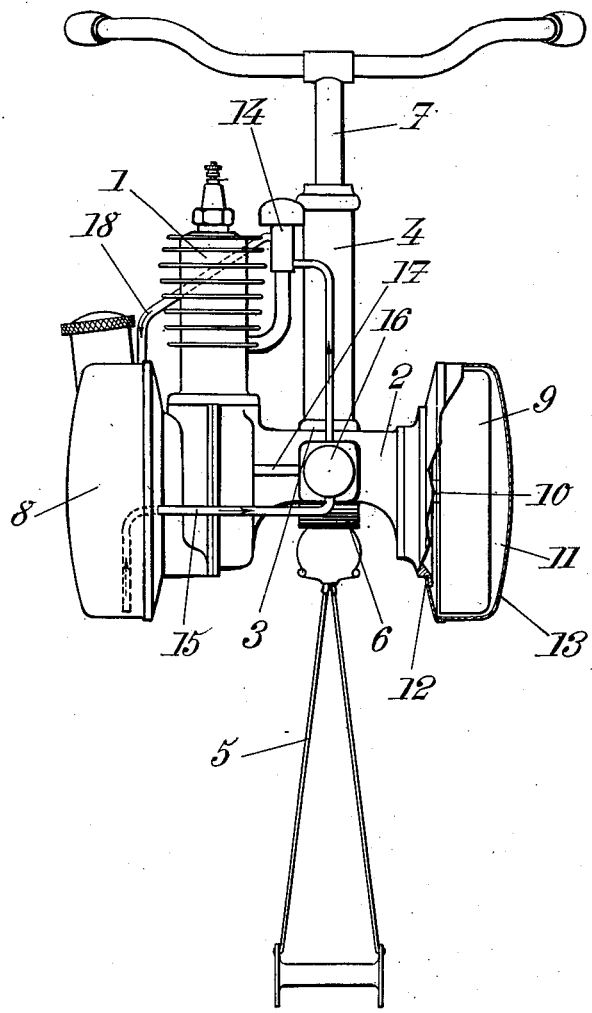
INVENTOR
MARCEL MENNESSON
BY
HIS ATTORNEY Patented June 20, 1944

2,351,992

UNITED STATES PATENT OFFICE 2,351,992

AUXILIARY DEVICE ADAPTED TO DRIVE LIGHT VEHICLES

Marcel Mennesson, Nice-Mt. Boron, France; vested in the Alien Property Custodian Application October 22, 1942, Serial No. 462,902
In France November 4, 1941

3 Claims. (Cl. 180—33)

My invention relates to auxiliary devices adapted to drive light vehicles such as cycles and the like, and comprising an engine proper with the corresponding flywheel, a driving member for one of the vehicle wheels, such member usually acting by frictional engagement, and a number of engine accessories. These devices preferably form a driving unit pivoted about a shaft carried by the vehicle and urged against the corresponding wheel by gravity or by spring means.

One object of my invention is to provide an auxiliary driving unit of the kind above referred to, wherein the fuel tank is rigidly carried by the unit proper and practically forms a part of same.

Another object of my invention is an auxiliary driving unit of the character described, wherein the fuel tank is carried by the lower portion of the unit to lower the center of gravity thereof.

Still a further object of my invention consists in an auxiliary driving unit wherein the carburettor is disposed above the fuel tank and is fed by means of a fuel pump.

My invention also contemplates an auxiliary driving unit of the kind above referred to, wherein the fuel tank is disposed co-axially to the crankshaft and in opposed relation to the flywheel with respect to the vehicle wheel associated with the said unit.

The annexed drawing diagrammatically shows a front view of an auxiliary driving unit constructed in accordance with my invention and actuating the front wheel of a bicycle or the like.

The driving unit illustrated comprises an engine proper 1, for instance of the two-stroke type, carried by a casing or support 2 pivoted on a member 3 supported by the front fork which cooperates with the front wheel 5 of the cycle. The frame proper is shown at 4. The engine is disposed laterally of wheel 5 and the latter is driven by means of a driving roller 6 in frictional engagement with the tire.

The fuel tank 8 is placed against the crankcase of engine 1, on the opposite side of the same with respect to wheel 5 and co-axially to the crankshaft. It is preferably cylindrical as and for the purposes explained belolw.

There is associated with engine 1 a flywheel 9 keyed on the engine shaft or crankshaft 10 on the other side of wheel 5 with respect to engine 1. Flywheel 9 is preferably enclosed within a casing 11 carried by a flange 12 of support 2 and comprising a removable cover 13.

It will be apparent that by disposing flywheel 9 at an appropriate distance from wheel 5 the unit may be approximately balanced with respect to roller 6. Of course, since the quantity of fuel within tank 8 varies, this balance cannot be accurate.

Tank 8 and casing 11—13 are preferably similar in shape, as illustrated, in such a manner that the unit appears as a symmetrical assembly.

The engine carburettor 14 is preferably disposed above tank 8 directly against the engine cylinder, as usual. It is of the overflow type and is fed from a fuel conduit 15 by a fuel pump 16, of the membrane type, actuated by pressure variations within the engine crankcase, such pressure variations being transmitted by a pipe 17. And there is also provided an overflow pipe 18 returning to tank 8 the surplus of fuel from carburettor 14.

I claim:

1. In an auxiliary driving unit for a bicycle, the combination of a supporting member adapted to be mounted on the fork for the front wheel of the bicycle; a casing hinged to said member on a pivot disposed transversely to the vertical axis of said wheel; a shaft journaled in said casing; a roller on said shaft adapted to frictionally engage the periphery of said wheel; an engine mounted on said casing and adapted to drive said shaft; a fly wheel on said shaft; a cylindrical housing about said fly wheel on one end of said casing; and a cylindrical fuel tank on the other end of said casing and connected with said engine, the housing and tank being concentric and of the same diameter.

2. In an auxiliary driving unit for a bicycle, the combination of a supporting member adapted to be mounted on the fork for the front wheel of the bicycle; a casing hinged to said member on a pivot disposed transversely to the vertical axis of said wheel; a shaft journaled in said casing; a roller on said shaft adapted to frictionally engage the periphery of said wheel; an engine mounted on said casing and adapted to drive said shaft; a fly wheel on said shaft; a housing about said fly wheel on one end of said casing; and a fuel tank on the other end of said casing and connected with said engine, the engine, fly wheel, housing and tank being so related that the load pivoted on the supporting member is substantially symmetrically distributed with respect to the said vertical axis.

3. In an auxililary driving unit for a bicycle, the combination of a supporting member adapted to be mounted on the fork for the front wheel of the bicycle; a casing hinged to said member on a pivot disposed transversely to the vertical axis of said wheel; a shaft journaled in said casing; a roller on said shaft adapted to frictionally engage the periphery of said wheel; an engine mounted on said casing and adapted to drive said shaft; a fly wheel on said shaft; a cylindrical housing about said fly wheel on one end of said casing; and a cylindrical fuel tank on the other end of said casing and connected with said engine, the housing and tank being concentric and of the same diameter, and the engine, fly wheel, housing and tank being so related that the load pivoted on the supporting member is substantially symmetrically distributed with respect to the said vertical axis.

MARCEL MENNESSON.